United States Patent [19]

Yamada

[11] Patent Number: 5,755,367

[45] Date of Patent: May 26, 1998

[54] HOLDER FITTING STRUCTURE

[75] Inventor: Hiroshi Yamada, Shizuoka, Japan

[73] Assignee: NEC Corporation, Tokyo, Japan

[21] Appl. No.: 648,952

[22] Filed: May 16, 1996

[30] Foreign Application Priority Data

May 16, 1995 [JP] Japan .................................. 7-116883

[51] Int. Cl.$^6$ ...................................................... A45F 5/00
[52] U.S. Cl. ........................ 224/245; 224/666; 224/678; 224/930; 455/351
[58] Field of Search ................................ 224/245, 666, 224/678, 242, 930, 269; 455/351; 24/3.11, 3.12

[56] References Cited

U.S. PATENT DOCUMENTS

| | | | |
|---|---|---|---|
| 4,299,344 | 11/1981 | Yamashita et al. | 224/678 |
| 4,325,142 | 4/1982 | Nakazawa | 455/351 |
| 4,887,753 | 12/1989 | Allen | 24/3.11 |
| 5,097,997 | 3/1992 | Kipnis et al. | 24/3.12 |

FOREIGN PATENT DOCUMENTS 50941  4/1992  Japan .

*Primary Examiner*—Linda J. Sholl
*Attorney, Agent, or Firm*—Sughrue, Mion, Zinn, Macpeak & Seas, PLLC

[57] ABSTRACT

A selective calling receiver 1 has on its sides grooves 1a having concave parts 1b, and a holder 2 has rails 2b having convex parts 2c to engage into the grooves 1a; when to be fitted, the rails 2b of the holder 2 are engaged into the grooves 1a of the receiver 1, and the elasticity of the arm sections 2a of the holder 2 fixes the holder 2 in a position in which the convex parts 2c have fallen into the concave parts 1b. The holder 2 is fitted when the receiver 1 is to be carried, and protects and holds the receiver 1.

7 Claims, 3 Drawing Sheets

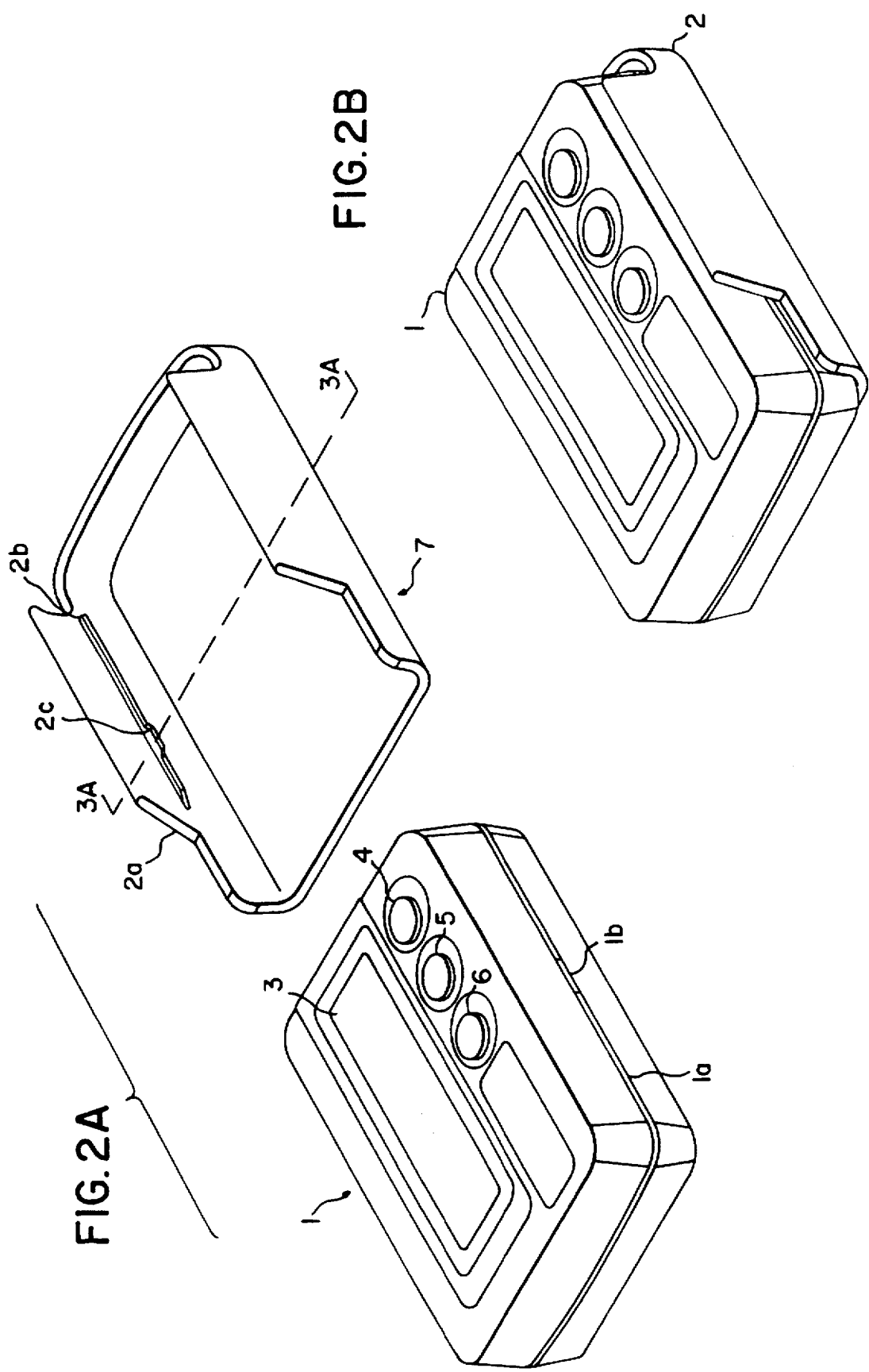

HOLDER FITTING STRUCTURE

BACKGROUND OF THE INVENTION

1. Field of the Invention

The present invention relates to a holder fitting structure, and more particularly to a holder fitting structure for use in carrying a paging receiver.

2. Description of the Related Art

One example of case holder for fitting a paging receiver to the carrier's waist belt or the like is disclosed in the Gazette of the Japanese Utility Model Laid-open No. 1992-50941.

FIG. 1 shows a schematic perspective view of the structure of a case holder described in the Gazette. In the diagram, a case holder 13 is provided with a box-shaped case holding section 10, open upward, for holding a paging receiver 15 having a display section 16 in front and with a butterfly clip 14 for fixing the receiver 15 held thereby to a waist belt 12. Generally, many a receiver of this kind like the receiver 15 is thin and rectangularly shaped, and fixed to the carrier's waist to keep its front in parallel with his or her body surface so as to minimize its cumbersomeness to the carrier.

Such a holder fitting structure for a paging receiver according to the prior art has a configuration to partly envelope the paging receiver with a case holding section to hold the front of the paging receiver where its display section and operation keys are arranged. As a consequence, the height of the case holding section should be set so as not to cover the display section, buttons, ornamental label and so forth, all positioned on its front. Otherwise, the design of the receiver front would be restricted as to the size and position of these display and operating sections.

Moreover, since the front of the paging receiver is covered by the box-shaped case holding section, the overall thickness of the product is correspondingly increased.

SUMMARY OF THE INVENTION

An object of the present invention, therefore, is to provide an improved holder fitting structure representing a solution to the aforementioned problems.

Another object of the invention is to provide a holder fitting structure which does not restrict the positions of the display and operating sections of the case.

Still another object of the invention is to provide a holder fitting structure whose thickness can be smaller than otherwise.

According to the invention, there is provided a holder fitting structure having a U-shaped holder into which the case of a paging receiver or the like, when it is to be carried by a person, is to be slid with the bottom of the case first to protect and hold the case, wherein a groove of a prescribed length is formed in each side of the case in its lengthwise direction and a rail to engage into one or the other of the grooves to fix the holder is formed on the inner face of each side of the holder in its lengthwise direction.

Preferably, a concave part should be formed in a part of the bottom of each groove of the case, and a convex part should be formed on the surface of each rail on the holder in a position opposite to the concave part in the groove of the case; the two sides of the holder should be elastic to give inward force to engage the rails of the holder into the grooves of the case, and the elasticity of the holder fixes the holder in a position in which the convex parts of the rails have fallen into the concave parts of the grooves.

BRIEF DESCRIPTION OF THE DRAWINGS

These and other objects, features and advantages of this invention will become more fully apparent from the following detailed description when taken in conjunction with the accompanying drawings, in which:

FIG. 2(a) shows an external perspective view of a selective calling receiver before being fitted to a holder together with the holder, and FIG. 2(b), an external perspective view of the selective calling receiver after being fitting to the holder together with the holder.

In the drawings, the same reference numerals denote the same structural elements.

DETAILED DESCRIPTION OF THE PREFERRED EMBODIMENT

Figure 1:
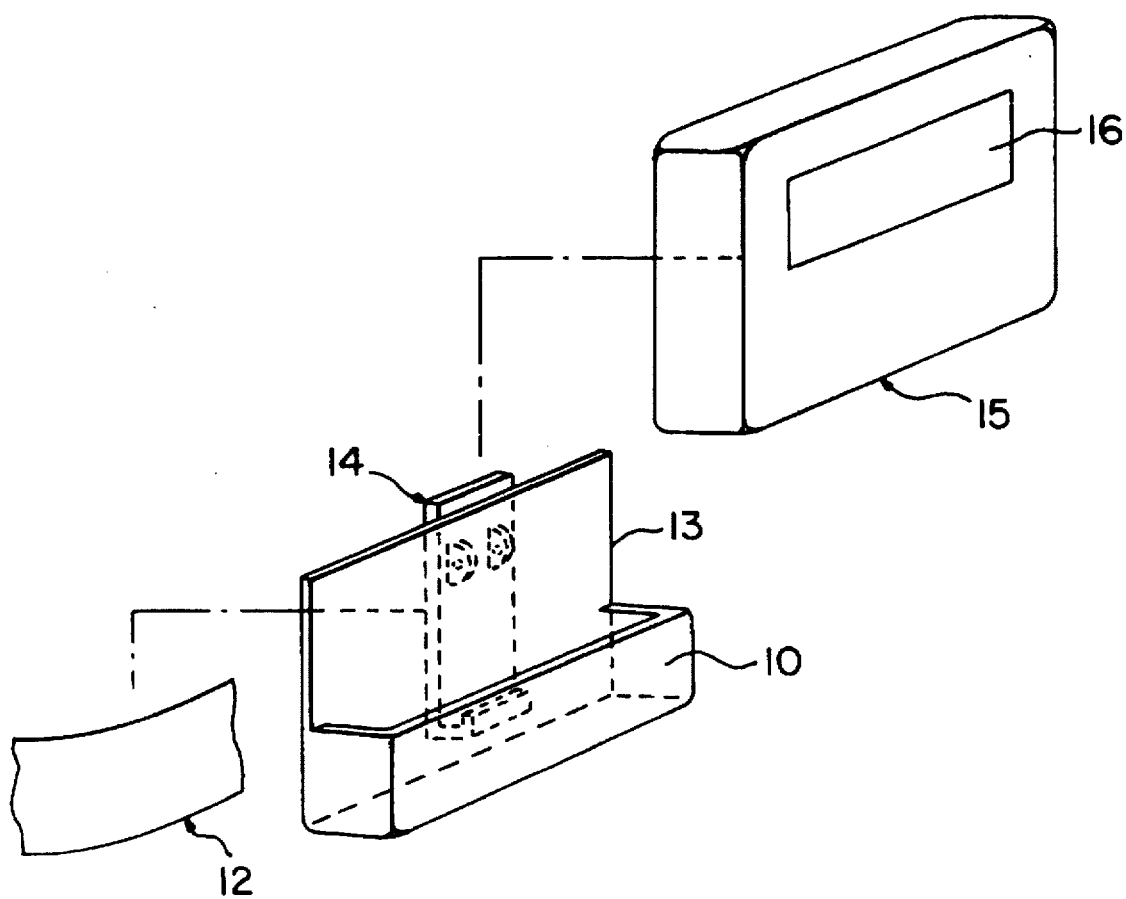
FIG. 1 shows a schematic perspective view of a holder structure according to the prior art.

Next will be described a preferred embodiment of the present invention with reference to drawings. FIG. 2(a) shows a perspective view of the embodiment before the receiver is fitted to the holder. A case, e.g., selective calling receiver 1 has a groove 1a around its side faces, and the groove 1a has a concave part 1b at the center of each side of the selective calling receiver 1. A display 3 and switches 4 to 6 are provided on the front face of the selective calling receiver 1. On the other hand, a holder 2 has an arm section 2a on each side, and these arm sections have no curved or angular part covering the front of the receiver. On the inner face of each arm section is provided a rail 2b which engages into the groove 1a of the selective calling receiver 1 to keep the selective calling receiver 1 from coming off in the forward direction. At the center of each of these rails 2b is provided with a convex part 2c which, when the holder 2 is fitted to the selective calling receiver 1, falls into one of the concave parts 1b to keep the selective calling receiver 1 from coming off in the direction reverse to the direction of its insertion. The two arms of the holder 2 are elastic to give inward force.

FIG. 2(b) shows a perspective view of the selective calling receiver 1 after being fitted to the holder 2. When the holder 2 is to be fitted to the selective calling receiver 1, the rails 2b of the holder 2 are engaged into the groove 1a of the selective calling receiver 1, and this causes the convex parts 2c of the rails 2b to force the arm sections 2a of the holder 2 to slightly expand outward. Continuing to engage the rails 2b further into the groove 1a forces the convex parts 2c of the rails 2b into the concave parts 1b of the groove 1b, and the holder 2 is fixed in this position. When the holder 2 is to be detached, it can be readily removed by pulling the holder 2 in the direction reverse to its engaging direction.

Although this preferred embodiment has the groove 1a all around the side faces of the selective calling receiver 1, this arrangement as it is represents a design consideration, and grooves of a necessary length only in the two sides of the selective calling receiver 1 would be sufficient for merely fitting the holder 2. Furthermore, two or more pairs of the concave parts 1b of the groove 1a and the convex parts 2c of the rails 2b may be provided for greater stability of fitting.

Figure 3A:
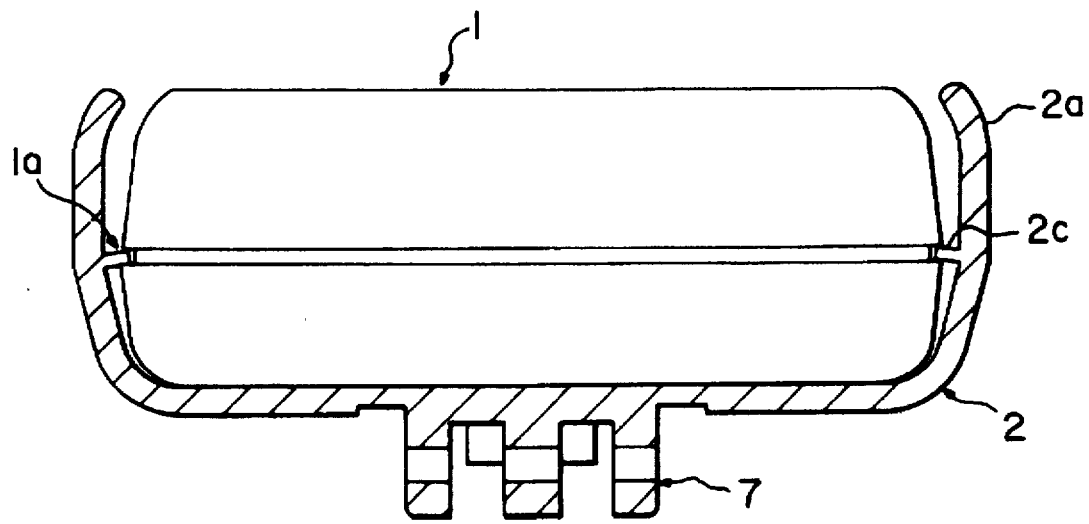
FIGS. 3(a) and 3(b) show the 3A—3A cross sections in FIG. 2(a) of the selective calling receiver when being inserted into and when fitted to the holder, respectively.

FIG. 3(a) shows the 3A—3A cross sections in FIG. 2(a) of the selective calling receiver 1 when being inserted into the holder 2, wherein the convex parts 2c are pressed against the bottoms of the groove 1a and the arm sections 2a are thereby expanded outward. The holder 2 has a butterfly clip 7 on its back face.

Figure 3B:
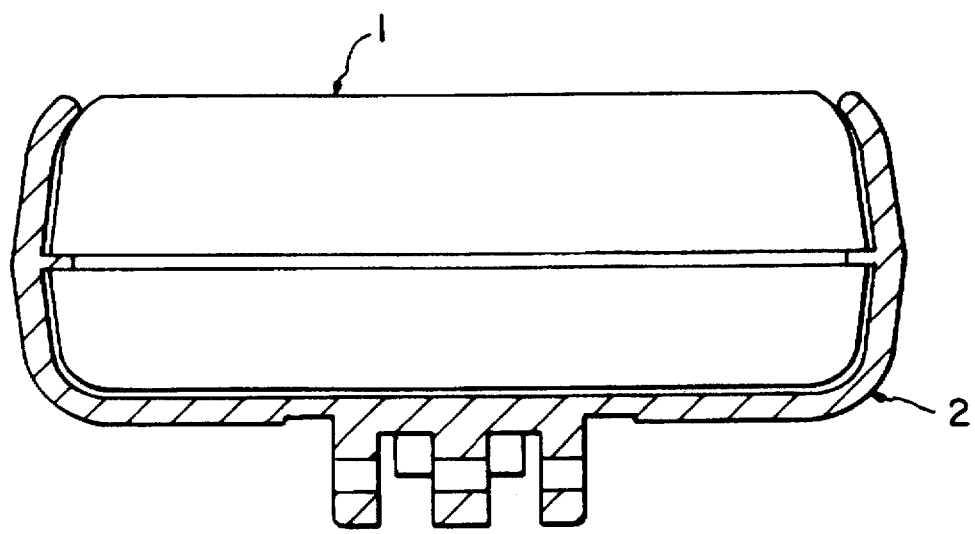

FIG. 3(b) shows the 3A—3A cross sections in FIG. 2(a) of the selective calling receiver 1 when fitted to the holder 2, wherein the convex parts 2c are engaged into the concave parts 1b of the groove 1a and the inwardly curved parts of the arm sections 2a support the sides of the selective calling receiver 1.

As hitherto described, the holder fitting structure according to the invention, since it fits the holder with the grooves in the sides of the case of the paging receiver or the like and the rails on the holder, involves no curved or angular part of the holder which would cover the front of the paging receiver, and accordingly the invention provides the benefits of freeing the design of the front face of the paging receiver from restrictions as to the positioning of the display section, buttons and ornamental label and of making it possible to reduce the overall thickness by the thickness of the holder arm sections that would otherwise cover the front face of the paging receiver. There is another benefit of eliminating the risk of damaging the surface of the paging receiver or the like when the holder is fitted or detached.

While the invention has been described with reference to a specific embodiment thereof, it will be appreciated by those skilled in the art that numerous other variations, modifications and embodiments are possible and, accordingly, all such variations, modifications and embodiments are to be regarded as being within the spirit and scope of the invention.

What is claimed is:

1. A holder for holding a case with a longitudinal groove provided in two opposed side walls, each longitudinal groove having a concave part formed in a bottom thereof, said holder comprising:

a back wall supporting two opposed arm sections to define a shape for covering a back and said two opposed side walls of said case:

a rail formed on an inner face of each of said arm sections for engaging with said longitudinal grooves; and a convex part formed on each of said rails for engaging with said concave parts of said longitudinal grooves;

wherein said two opposed arm sections of said holder are elastic and provide an inward force to urge said rails against said bottoms of said longitudinal grooves upon fitting said case into said holder, such that when aligned, said convex parts of said rails insert into said concave parts of said longitudinal grooves.

2. A holder for holding a case, as claimed in claim 1, wherein each of said longitudinal grooves is formed at a middle of each of said two opposed side walls of said case with respect to a width direction, and each of said rails is formed at a middle of each of said two opposed arm sections of said holder with respect to said width direction.

3. A holder for holding a case, as claimed in claim 1, wherein a distance between each of said longitudinal grooves and said back of said case is about equal to a distance between each of said rails and said back wall of said holder.

4. A holder for holding a case, as claimed in claim 2, wherein each of said longitudinal grooves has a plurality of concave parts and each of said rails has a plurality of convex parts, the number of said concave parts being equal to that of said convex parts.

5. A holder for holding a case, as claimed in claim 3, wherein each of said longitudinal grooves has a plurality of concave parts and each of said rails has a plurality of convex parts, the number of said concave parts being equal to that of said convex parts.

6. A holder for holding a selective calling receiver with a longitudinal groove provided in two opposed side walls, each longitudinal groove having a concave part formed in a bottom thereof, said holder comprising:

a back wall supporting two opposed arm sections to define a shape for covering a back and said two opposed side walls of said case;

a rail formed on an inner face of each of said arm sections for engaging with said longitudinal grooves; and a convex part formed on each of said rails for engaging with said concave parts of said longitudinal grooves;

wherein said two opposed arm sections of said holder are elastic and provide an inward force to urge said rails against said bottoms of said longitudinal grooves upon fitting said selective calling receiver into said holder, such that when aligned, said convex parts of said rails insert into said concave parts of said longitudinal grooves.

7. A combination of a case and a holder for said case, said combination comprising:

a case having a groove provided in two opposed side walls, each groove having a concave part formed in a bottom thereof; and a holder having a back wall supporting two opposed arm sections for receiving said two opposed side walls of said case, a rail formed on an inner face of each of said arm sections engageable with said grooves, and a convex part formed on each of said rails engageable with said concave parts of said grooves;

wherein said two opposed arm sections are elastic and upon fitting said case into said holder, said bottoms of said grooves push against said convex parts of said rails to cause said two opposed arm section to move apart, such that when aligned, the elasticity of said two opposed arm sections urges said convex parts of said rails into said concave parts of said grooves to removeably fix said case to said holder.

* * * * *